No. 646,183. Patented Mar. 27, 1900.
W. H. LAWRENCE & R. KENNEDY.
MILKING APPARATUS.
(Application filed May 9, 1899.)
(No Model.) 3 Sheets—Sheet 1.

Witnesses. Inventors.
William H. Lawrence,
Robert Kennedy,
By H. H. de Vos.
Attorney.

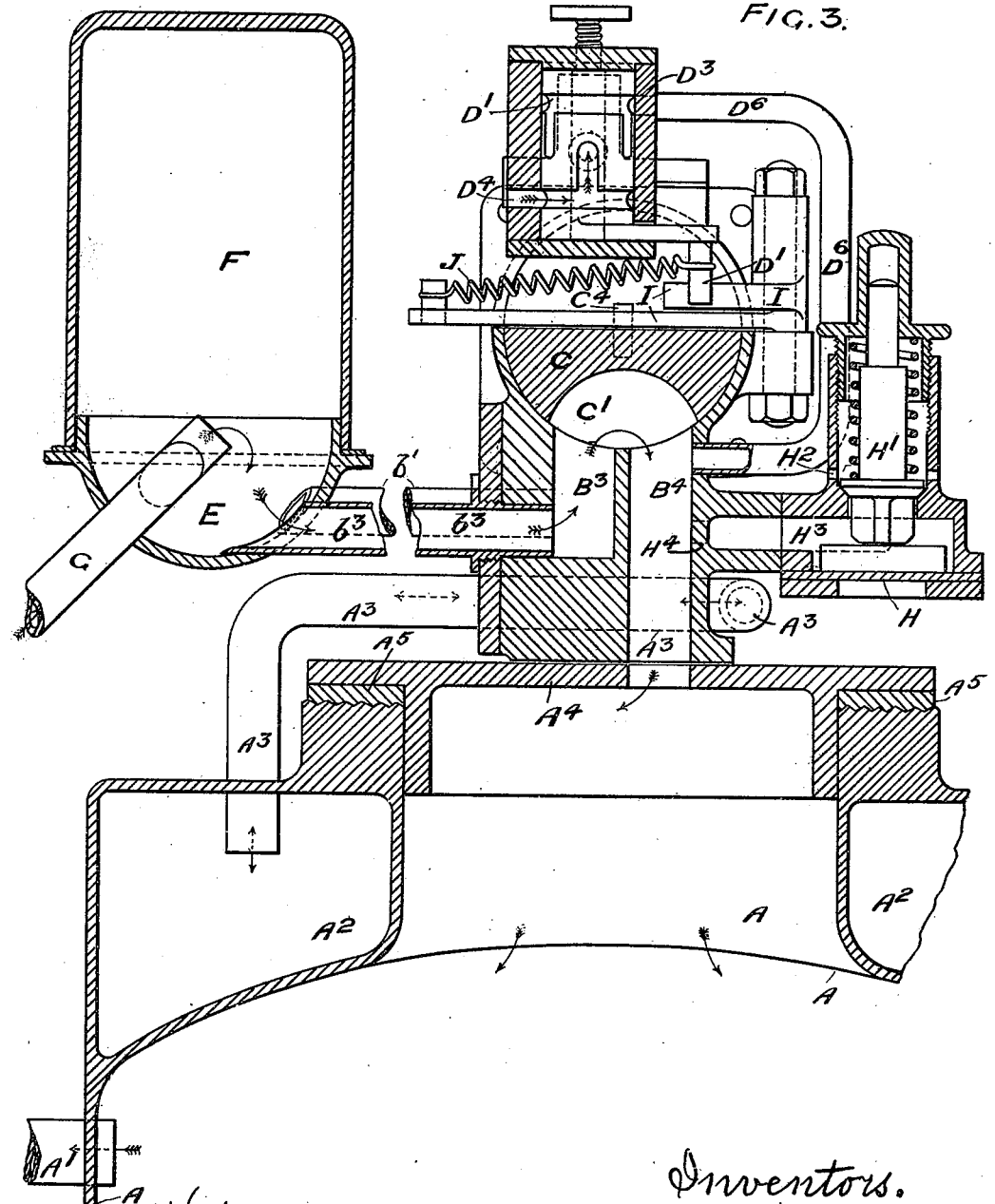

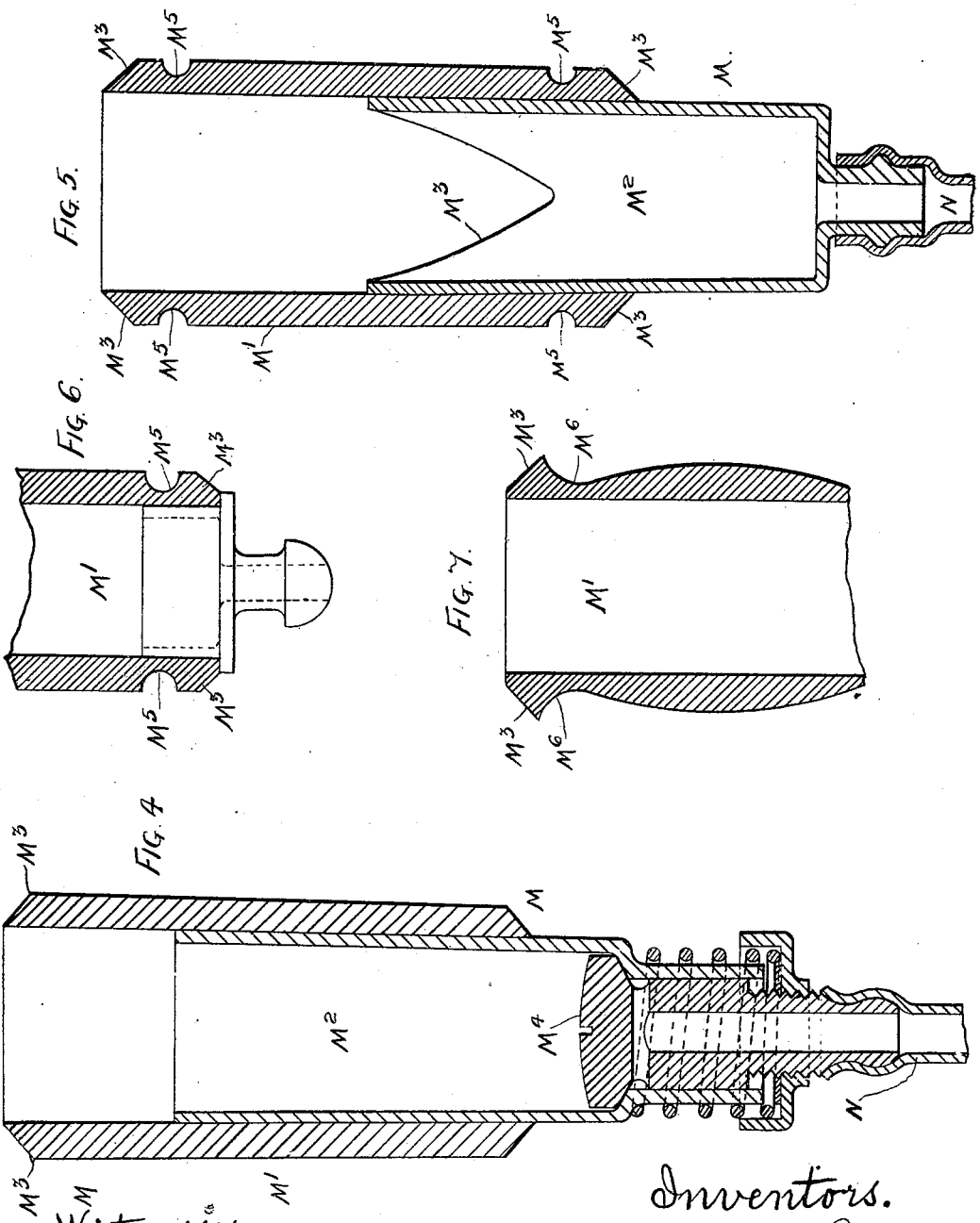

UNITED STATES PATENT OFFICE.

WILLIAM HENRY LAWRENCE AND ROBERT KENNEDY, OF GLASGOW, SCOTLAND.

MILKING APPARATUS.

SPECIFICATION forming part of Letters Patent No. 646,183, dated March 27, 1900.

Application filed May 9, 1899. Serial No. 716,076. (No model.)

*To all whom it may concern:*

Be it known that we, WILLIAM HENRY LAWRENCE, residing at 158 Kenmure street, Pollokshields, Glasgow, and ROBERT KENNEDY, residing at 109 South Portland street, Glasgow, Scotland, have invented certain new and useful Improvements in Milking Apparatus, (which has been patented in Great Britain on October 15, 1898, No. 21,738,) of which the following is a specification.

This invention relates to milking apparatus in which pulsating apparatus in the form of a vacuum-motor is fitted on or in proximity to the milk-receptacle and is operated by suction from suction-producing apparatus or a vacuum-chamber placed at any convenient distance therefrom in order to produce a pulsating action at the teat-cups of the milking apparatus by suitably and intermittently varying the suction acting on the cow's teats between maximum and minimum degrees.

The present improvements have for their object to simplify and improve the action of such apparatus and to render the same in general more efficient.

Figure 1:
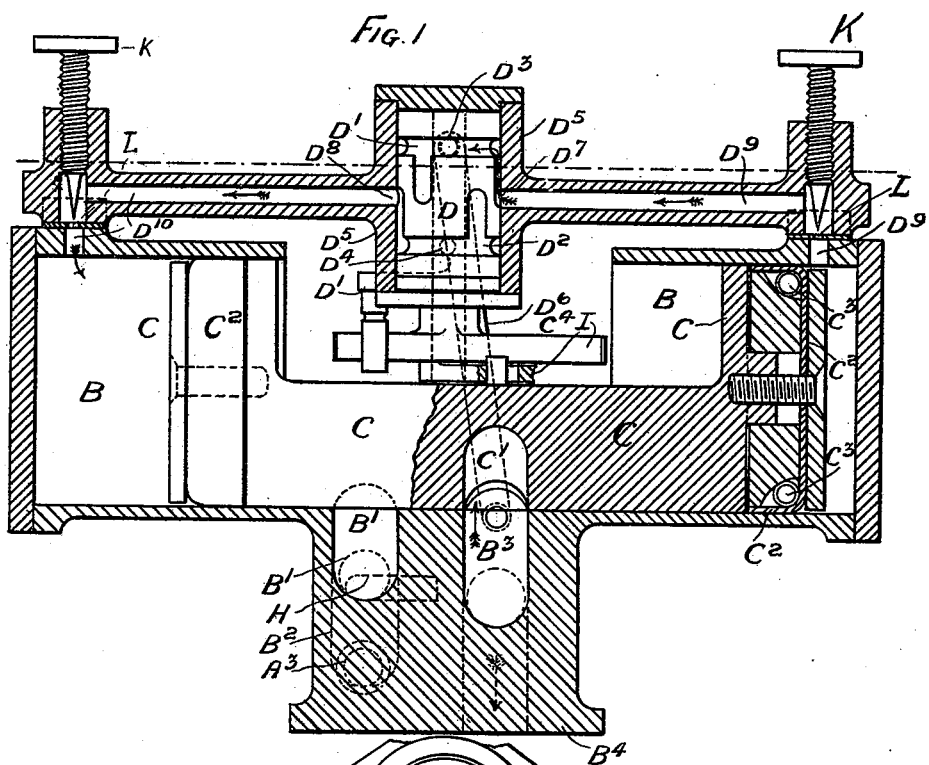
Figure 2:
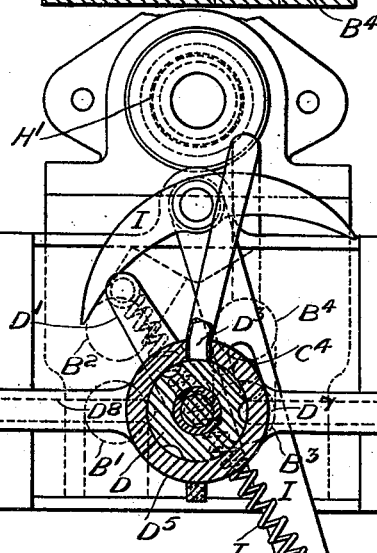

The invention is illustrated by the accompanying drawings, Figure 1 being a vertical longitudinal section of the pulsating apparatus, and Fig. 2 a horizontal section of the same. Fig. 3 is a transverse vertical section of the pulsating apparatus fitted in position on the milk-receptacle or maximum-vacuum chamber. Figs. 4, 5, 6, and 7 are vertical sections of various forms of teat-cups.

Under the present invention we connect the milk-receptacles A, part of one of which is shown at Fig. 3, by branches A' to a single main pipe led from the suction-producing apparatus or vacuum-chamber, and we utilize a part of each milk-receptacle A as a minimum-vacuum chamber, the milk pail or receptacle A being for this purpose made with a closed double casing $A^2$ at its upper end or other part and having both its chambers A $A^2$ connected to the pulsating apparatus.

The pulsating apparatus consists of a cylinder B, in which works a double-ended piston C, provided with cup-leathers $C^2$, beneath each of which an endless spiral spring $C^3$ in the form of a ring is placed in order to press the leathers tight against the cylinder B, either end of the piston being alternately put into communication with the atmosphere and with the suction-producing apparatus through the milk-receptacle A by means of a valve D, actuated from the piston.

The valve D for actuating the pulsator-piston C has around its circumference two annular grooves $D' D^2$, which are in constant communication with two ports $D^3 D^4$, respectively, in the valve-casing $D^5$, one, $D^3$, of which communicates by means of a pipe $D^6$ with the maximum-vacuum chamber A and the other with the atmosphere by means of the port $D^4$. Each annular groove $D' D^2$ has three vertical grooves connected therewith, the alternate groove being connected to the top and bottom annular grooves $D' D^2$, so that as the valve D is turned it, by means of two ports $D^7 D^8$ in the valve-casing $D^5$, connected by passages $D^9 D^{10}$ to either end of the cylinder B, establishes communication between one end of the piston C and the vacuum and between the other end and the atmosphere in order to traverse the piston C in either direction. The alternate vertical grooves of atmospheric air and vacuum balance the valve D, so that it floats and can be readily turned by the action of the piston C. The actuating-valve D has a lever-arm $D^{11}$ attached to its lower side, adapted to be acted on by a trip-lever I, pivoted on the cylinder-casing B and actuated by the movement of the piston C through a pin $C^4$, which engages a slot I' in said lever. The trip-lever I moves with the piston and acts upon the valve lever-arm $D^{11}$ to turn it, the lever-arm $D^{11}$ being so connected to the valve that the said arm is free to turn through an angle of about thirty degrees before the valve D is acted upon, a spring J being so connected between these two levers $D^{11}$ and I that the spring carries the valve D suddenly through the next thirty degrees, which is the necessary distance to bring the other set of grooves into communication with the passages $D^9 D^{10}$ and effect the reversal of the piston C. The passages $D^9 D^{10}$, leading from the valve-casing $D^5$ to the cylinder B, are at their junction therewith provided with regulating-screws K, the conical points of which may be periodically fully screwed down, so as to clear the needle-holes L, which form the entrances to the cylinder B and dislodge any foreign matter therefrom.

The cylinder B is provided with four ports B' B² B³ B⁴, arranged in pairs B' B² and B³ B⁴ transversely of the cylinder, the two ports of each pair being put into communication with each other on the movement of the piston C by means of a transverse recess C' in said piston, so as to make alternate connections between the maximum-suction chamber A or minimum-vacuum chamber A² and the teat-cups, (shown by Figs. 4 and 5 and hereinafter described,) causing the cup to collapse and the milk to flow from the cow's teats into the milk-pail maximum-suction chamber A or to relieve the suction to such an extent as to allow the teat-cups M to expand to their normal condition. Each of the ports B' B³ on one side of the longitudinal axis of the cylinder is connected by pipes $b'$ $b^3$ to a cup E, covered by a glass dome F and forming an inspection-cup, which is in turn connected to a pipe or pipes G, leading to the teat-cups M. These pipes G, of which there are preferably two, are led into this inspection-cup E and bent in such wise as to prevent any backward surge of the milk on the release of the suction due to the recess C' in the piston C being transferred from the maximum to the minimum suction ports. The connection between the inspection-cup E and the ports B' B³ on one side of the longitudinal axis of the cylinder B is obtained through the passages $b'$ $b^3$. One port B³ when put into connection by the piston-recess C' with its neighbor B⁴ places the inspection-cup E into communication with the milk-pail A or maximum vacuum, and the other when the piston C moves places the inspection-cup E in communication with the partial or minimum vacuum chamber A² of the milk-pail and which constitutes a minimum-vacuum storage-chamber, the minimum or partial vacuum being automatically produced therein by the alternate connection of the inspection-cup E with the maximum-vacuum and the minimum-vacuum chamber A². The maximum vacuum produced in the inspection-cup E serves at each alternate movement of the piston C to exhaust the minimum-vacuum chamber A², and the degree of vacuum in the latter is prevented from exceeding that desired by means of a spring-loaded diaphragm-valve, the diaphragm H of which is preferably of larger area than the valve, and on being raised by the atmospheric pressure acts upon the valve H' to raise it and admit air to the minimum-vacuum chamber A² by way of holes H² in the valve-casing above and a passage H³ below the valve-seat and a port H⁴ in the cylinder-casing communicating with the port B², the latter being in constant communication with the minimum-vacuum chamber by a pipe A³.

The pulsating apparatus is secured upon the lid A⁴ of the milk-pail or maximum-vacuum chamber A, and is made air-tight upon said chamber by a rubber ring A⁵ or other means.

The teat-cups M are preferably formed of removable and reversible sleeves M', which can be made of rubber tubing cut with beveled ends and which are fitted to slide upon metallic cylinders M², so that the length of the flexible tubing M' engaging the cow's teats may be varied or adjusted to suit the length of teat, and the metallic cylinders M² are by preference cut at an angle, as shown at M⁸, Fig. 5, on each side, or to cone shape, so that the rubber tube M' may tend to flatten or collapse always in the same direction when the suction is applied. The lower end of the cylinder is preferably, as shown at Fig. 4, closed by a spring-loaded valve M⁴, through which the milk passes into a flexible tube N, connected to the valve M⁴, and to the inspection-cup E. The rubber portion of the teat-cups may have semicircular grooves M⁵, as shown at Figs. 5 and 6, formed around them near both ends, or they may be thinned down near the ends, as shown at Fig. 7, which grooving or thinning has the effect of allowing that portion of the rubber between these grooves M⁵ or thinned portion M⁶ to collapse without affecting the parts which take hold upon the cow's teats and upon the metallic outlet-passage.

The action of the apparatus is as follows: After placing the pulsator on the milk-receptacle the connection between the vacuum-supply is opened, which causes the piston to reciprocate and partly exhaust the minimum-vacuum reservoir. The teat-cups are then applied to the teats, which alternately collapse and expand under the variations of vacuum so produced. When the connection is established with the maximum vacuum and teat-cups, the milk is, by the combined action of the suction and collapse of the cup, drawn into the milk-receptacle, and on the connection being changed to the minimum-vacuum reservoir the suction on the teat is reduced sufficiently to stop the flow of milk and allow the cup to expand. When this is taking place, the pulsator-piston C is in the position shown at Figs. 1, 2, and 3, the milk being drawn from the cow's teats and passing by way of the inspection-cup E through the passage $b^3$, port B³, recess C', and port B⁴ to the milk-receptacle A. The lever-arm D¹¹ on the pulsator-actuating valve D has been acted upon by the trip-lever I and is just about to complete its travel under the action of the spring J, which latter has now been brought by the movement of the lever-arm D' past the center line of said lever-arm. The lower end of the valve D is cut away to allow of the free movement of the lever-arm D¹¹, excepting only during the last thirty degrees or thereby of its travel, during which it carries with it the valve D to bring the annular groove communicating with the atmosphere into communication with that end of the cylinder B to which the piston C has traveled. The piston C is thus caused to move in the opposite direction to bring its recess $C'$ over the ports $B'$ $B^2$ and break the maximum suction by establishing communication between the inspection-cup E and minimum-vacuum chamber $A^2$, this action having the effect of reducing the suction at the teat-cups and stopping the flow of milk from the cow's teats. By this time the trip-lever I, having been acted upon by the piston C, has carried the lever-arm $D^{11}$ of the valve D over to the position in which the spring J acts upon it to carry it through the remainder of its travel and turn the actuating-valve D so as to establish communication with the atmosphere and that end of the cylinder B which was previously communicating with the vacuum. The piston C is then caused to travel so that its recess $C'$ covers the ports $B^3$ $B^4$, whereby communication is again established by way of the inspection-cup E between the teat-cups and the maximum-vacuum chamber A, whereby milk is again caused to flow into the milk-receptacle A. The vacuum produced in the inspection-cup E tends to produce equal vacuum in the minimum-vacuum chamber $A^2$ when this is in communication with the former, and the milk would also flow toward the chamber $A^2$ but for the valve $H'$, which opens to admit air to this chamber by way of the port $H^4$ on the vacuum exceeding a predetermined degree.

Having now described the invention, what we claim, and desire to secure by Letters Patent, is—

1. In a milking-machine, the combination with pulsating apparatus operated by suction, of a milk-receptacle made with two compartments, one compartment A being connected to suction-producing apparatus and to a port $B^4$ in the pulsator and the other compartment $A^2$ connected to another port in the pulsator, and an air-admission valve $H'$ controlled by the vacuum so that in the compartment $A^2$ of the milk-receptacle a minimum degree of vacuum is maintained automatically by the action of the pulsator in conjunction with said air-admission valve.

2. In a pulsating apparatus operated by suction-producing apparatus at a distance therefrom, the combination of a cylinder B having in its four ports $B'$, $B^2$, $B^3$, $B^4$ an inspection-cup E and maximum-vacuum chamber, the cylinder-ports being arranged in pairs and communicating one pair $B^3$, $B^4$ with the milk-pail and the inspection-cup E and the other pair $B'$, $B^2$ with said cup E and with the minimum-vacuum storage $A^2$ and a piston C reciprocated by vacuum within said cylinder and having formed in it a recess $C'$ adapted to alternately connect the maximum and the minimum suction with the inspection-cup E.

3. In a milking apparatus operated by suction-producing apparatus at a distance therefrom, the combination with means for connecting the same with the teats of the animal to be milked, of a reversing-valve D formed with vertical grooves extending from annular grooves $D'$, $D^2$ communicating one with a vacuum-chamber and the other with the atmosphere, the vertical grooves being so arranged that the pressure and vacuum act equally on all sides.

4. A teat-cup formed by a rubber sleeve $M'$ and a metallic cylinder $M^2$ through which the milk is drawn the sleeve $M'$ being fitted to slide upon the cylinder for adjustment to suit varying lengths of cows' teats.

In witness whereof we have hereunto set our hands in presence of two witnesses.

WILLIAM HENRY LAWRENCE.
ROBERT KENNEDY.

Witnesses:
   WALLACE FAIRWEATHER,
   JNO. ARMSTRONG, Jr.